Aug. 16, 1960  S. N. JOHNSON  2,949,088
JOINING SHEET METAL PARTS
Filed Nov. 15, 1957  5 Sheets-Sheet 3
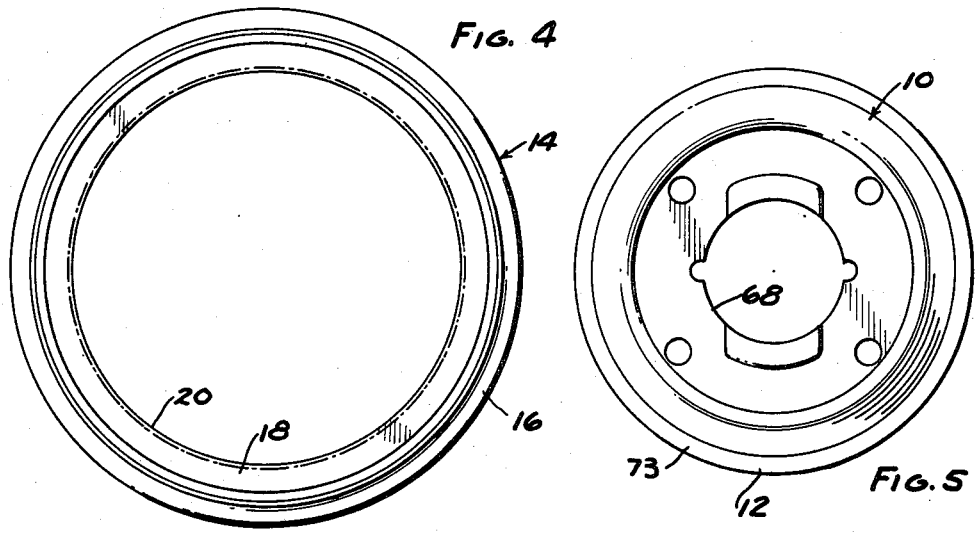
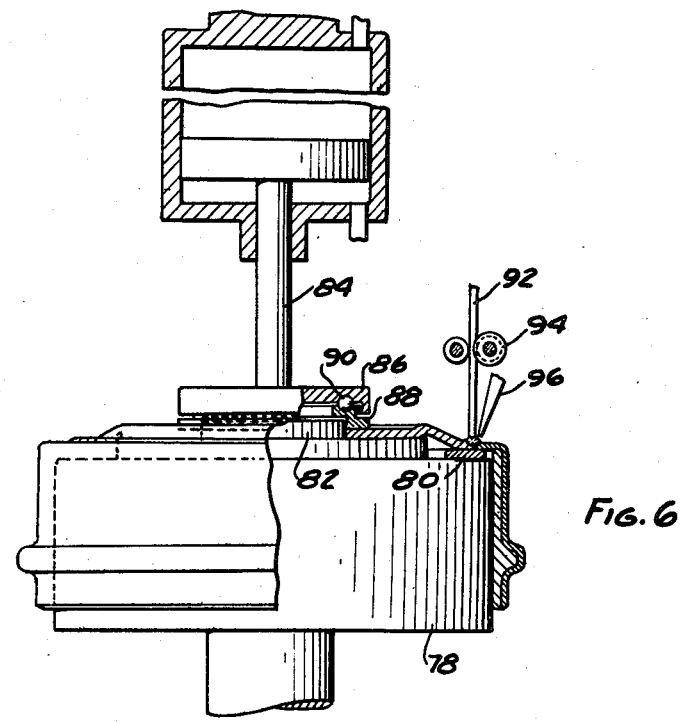
INVENTOR.
STANLEY N. JOHNSON
BY
ATTORNEYS Aug. 16, 1960   S. N. JOHNSON   2,949,088
JOINING SHEET METAL PARTS
Filed Nov. 15, 1957   5 Sheets-Sheet 5

INVENTOR.
STANLEY N. JOHNSON
BY
Barnes, Kisselle, Raisch & Choate
ATTORNEYS

United States Patent Office 2,949,088
Patented Aug. 16, 1960

2,949,088
JOINING SHEET METAL PARTS

Stanley N. Johnson, Lansing, Mich., assignor to Motor Wheel Corporation, Lansing, Mich., a corporation of Michigan Filed Nov. 15, 1957, Ser. No. 696,746
7 Claims. (Cl. 113—116)

This invention relates generally to joining of sheet metal parts and more particularly to a method of accurately aligning the mating edges of sheet metal work pieces in abutting relation preparatory to integrally uniting the parts together by means of an arc weld laid over the joint formed by the two abutting edges.

In its broadest aspects, the invention contemplates the obtaining of a uniformly tight joint between two sheet metal parts lying in the same plane wherein an inner edge of one of the parts completely or partially surrounds the outer edge of the other part. The invention is particularly suited for uniting a drum back to a drum ring of a brake drum where the joint is circular. The invention, however, is suited for many other applications where two sheet metal parts are designed to have their abutting edges arc welded together and is not necessarily limited to an arrangement wherein the joint between the two parts is in the form of a circular arc.

In the manufacture of brake drums from sheet metal the drum is sometimes formed as two metal stampings, a circular drum back and a drum ring. In assembly, the back is fitted within the ring and the two parts are welded together along their mating edges, preferably in an automatic welding machine of the type shown in Fig. 6.

In welding such parts together, it is very important to obtain a generally uniform depth of weld penetration. This is particularly true with thin sections such as sheet metal brake drums. A weld penetration of 75% to 80% of the total section of thickness is usually sought. If the penetration is shallow, that is, considerably less than 75% to 80% of the section thickness, the weld is weak. If the penetration is too deep, the heat of the arc will burn and pit the support surface of the welding machine on which the work pieces are mounted.

In a welding operation of this type, all other factors, such as the current input, wire feed, and speed of travel, remaining the same, the depth of the weld penetration will vary in accordance with the fit between the drum back and the drum ring. If the fit between these two parts is too tight, penetration will be shallow and if the parts are spaced too far apart along their abutting edges, the weld will penetrate completely through the two members.

In the ideal arrangement, the clearance between the mating edges of the drum back and drum ring should be just sufficient to allow easy insertion of the drum back into the opening in the drum ring. In high volume production where the drum back is blanked on one set of dies and the ring is blanked on another set of dies, it is impossible to obtain and maintain such a close fit. This is true for several reasons. To begin with, the cutting edges of dies do wear with use, so over a long production run, the diameter of the drum back will gradually increase in size and the diameter of the circular opening in the drum ring will gradually decrease in size.

For these reasons, undesirably large clearances are a practical necessity. For example, in a transmission brake drum having a diameter of about 7", a nominal clearance between the drum back and the drum ring of .015" with a permissible range of .005" to .025" is typical. In high volume production, it is impossible to accurately center the back within the drum ring aperture on the welder table so it may happen that there will be zero clearance between the mating edges for one point of the circle and .015" to .020" clearance at the diametrically opposite point with variations between those two extremes at intermediate points. Thus, the reason for the inability to obtain uniform welds with such arrangements is apparent.

The present invention has for its object the elimination of the problems referred to above and contemplates a method wherein a tight uniform fit between mating sheet metal parts is readily obtained so that in a subsequent welding operation, a predetermined and uniform depth of weld penetration can be consistently obtained in high volume production.

In the drawings:

Figures 4 and 5 are top plane views of a drum ring and a drum back, respectively, prior to being joined in accordance with the present invention.

Figure 6 is a fragmentary vertical sectional view of an automatic welder for laying an arc weld at the joint between the drum back and the drum ring.

In general, the invention proposes a method for obtaining a close fit between the mating edges of sheet metal work pieces wherein the joint is obtained by arranging the work pieces in overlapping relation between a punch and a die and by the action of the punch, one of the work pieces is caused to pierce the other and move into the plane of the other so that the thus formed abutting edges are arranged in tight coplanar engagement. In accordance with one embodiment of the invention, the punch and drawn drum back is caused to pierce its own opening in the drum ring. In the second embodiment of the invention, both the punch and the die are provided with cutting edges, and both drum parts are simultaneously sheared between the punch and die.

Figure 1:
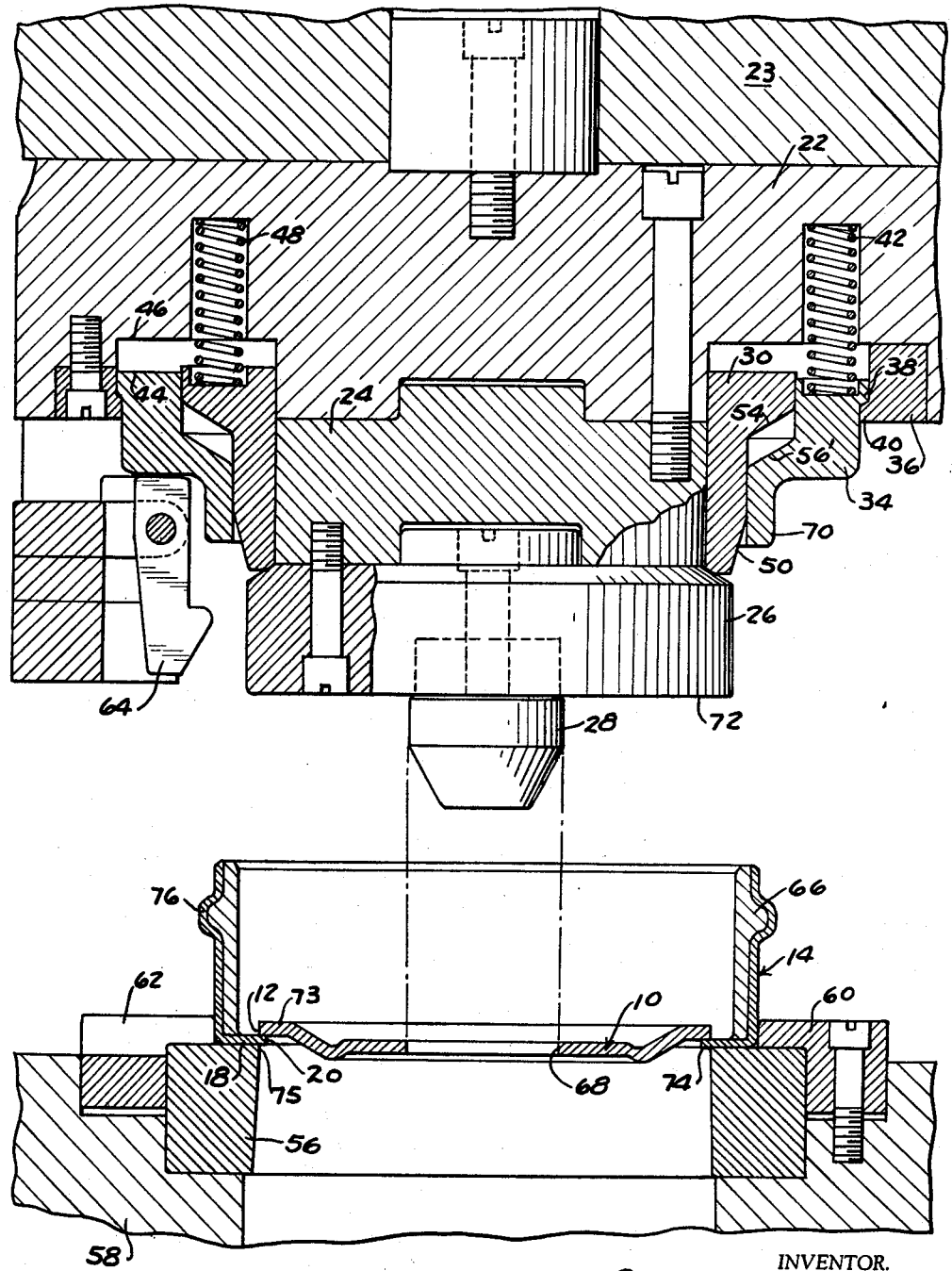
Figure 1 is a fragmentary vertical sectional view of a punch and die assembly utilized for practicing one embodiment of the present invention, the punch being shown at the top of its stroke.
Figure 2:
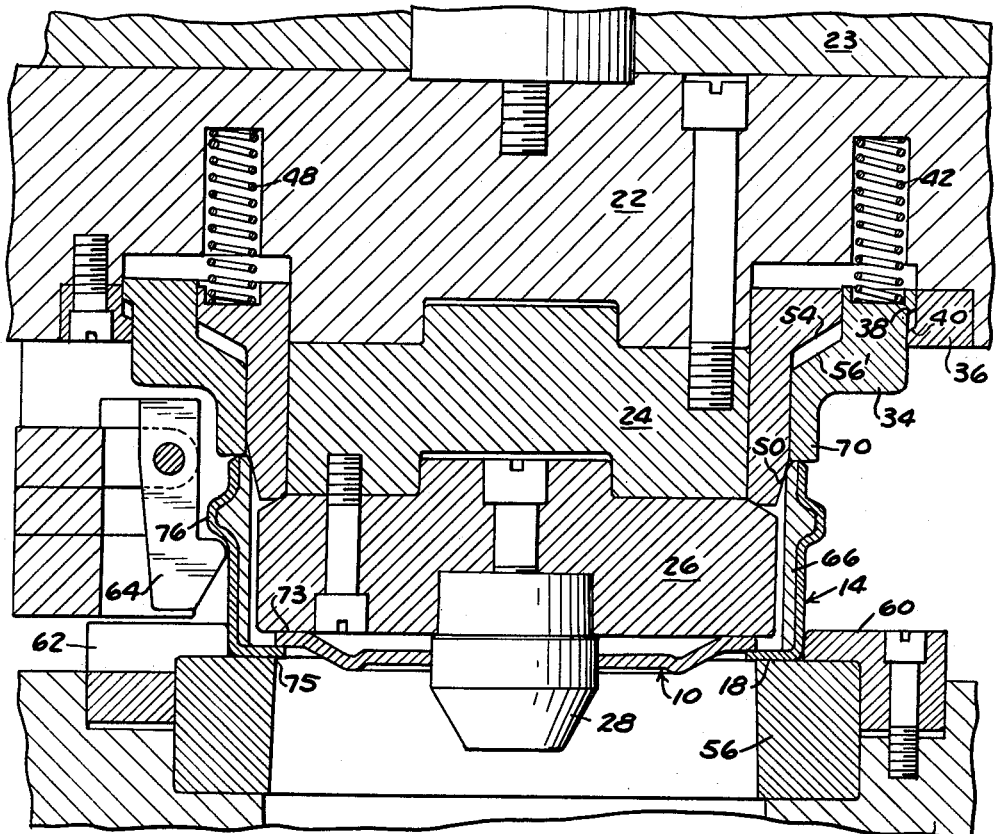
Figures 2 and 3 are views similar to Figure 1 and showing the action of the punch on its down stroke, the showing in Fig. 3 being at the bottom of the down stroke of the punch.
Figure 3:
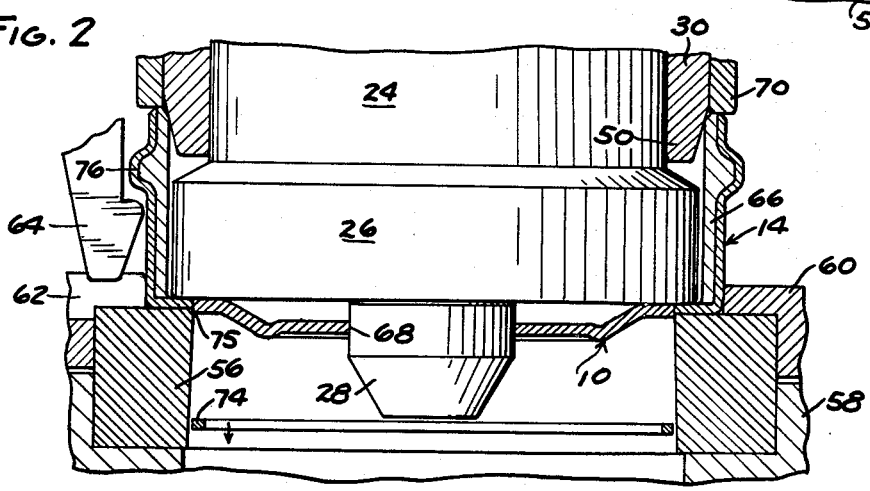

In practicing one embodiment of the invention, a punch and die assembly such as shown in Figs. 1, 2 and 3 may be employed. The drum back designated 10 in Fig. 5 has a circular outer edge 12 and the back 10 is initially trimmed to its finished size. The drum ring 14, shown in Fig. 4, is fashioned with a brake ring portion 16 and an annular radial flange portion 18. The diameter of the opening 20 defined by the flange portion 18 is smaller than the outer diameter of drum back 10.

In uniting these parts to form a completed brake drum, they are arranged in the punch and die assembly of a press as shown in Fig. 1. The punch assembly of the press consists essentially of three main parts; a punch holder 22 attached to the ram 23 of the press, an intermediate spacer 24, and a hardened punch proper 26 to which is attached a central pilot plug 28. The punch assembly illustrated is built up of several parts and bolted together in the manner illustrated instead of being made in one piece to save machining time and to avoid the use of expensive tool steels where they are not needed. A locating ring 30 has a close sliding fit around a portion of punch holder 22 and spacer 24. An annular pusher ring 34 fits closely around locating ring 30 and is slidably arranged within a retainer ring 36 bolted to the bottom side of punch holder 22. Pusher ring 34 and retainer ring 36 are formed with complementary annular shoulders 38 and 40, respectively which limit the downward movement of pusher ring 34 relative to punch holder 22. The pusher ring 34 is biased vertically downwardly on punch holder 22 by compression springs 42. The upward movement of pusher ring 34 on punch holder 22 is limited by the interengagement of the upper face 44 of ring 34 with the annular face portion 46 of the punch holder. Locating ring 30 is also biased downwardly on punch holder 22 by compression springs 48. The locating ring 30 has its outer face tapered inwardly adjacent the lower end thereof as at 50 and is fashioned with an inclined annular shoulder 54 that is complementary to an annular shoulder 56' on pusher ring 34.

The annular trim die 56 is mounted on the die shoe 58 by means of a ring clamp 60. Clamp 60 is formed with slots 62 to accommodate spring biased stripper pawls 64.

With the press ram at the top of its stroke (Fig. 1), the drum ring 14 with a rough bored brake liner 66 cast therein is placed on the trim die 56 within the opening defined by the ring clamp 60. Drum back 10 with its pierced-out center hole 68 is next laid on the inner or upper face of the drum ring flange 18 with the outer periphery of the back 10 overlapping the edge of flange 18 that defines the opening 20. As the punch 26 descends, the pilot 28 enters the opening 68 in drum back 10 to center the drum back with respect to the trim die 56. With further downward movement of the punch, the tapered end 50 of the downwardly biased locating ring 30 enters the open end of the drum ring 14, engages the cast lining 66 and centers the ring 14 with respect to the drum back 10. Just about the time the drum ring 14 is centered by the tapered end 50 of the locating ring 30, the lower end 70 of the pusher ring 34 contacts the upper end face of the drum ring 14 to hold the ring 14 down against the trim die under the pressure of springs 42 (Fig. 2). With both parts thus secured in place, the bottom face 72 of the punch seats against the upper annular face 73 of the drum back and drives it through the overlapped portion 74 of the drum ring flange 18 so that this overlap portion 74 is sheared out by the cooperation of the circular outer edge 12 of the drum back 10 and the cutting edge 75 of the underlying trim die 56 (Fig. 3). At the bottom of the stroke of ram 23, the lower face 72 of punch 26 seats against the upper or inner face of ring flange 18 so that the inner face 73 of drum back 10 is flush with the inner face of flange 18. The sheared-out overlap portion 74 drops down through the trim die 56.

As the press ram 23 rises, after completing its down stroke, the stripper pawls 64 engage the protruding rib 76 on the drum ring 14 and lift it upward to a point where the pawls 64 are released by means not shown to drop the assembly of ring 14 and drum back 10 onto a discharge chute.

The parts thus assembled are ready for arc welding and are transferred to an automatic arc welding machine such as shown in Fig. 6. This machine includes a rotatable table 78, a copper seating ring 80 which underlies the joint between ring 14 and drum back 10, and a center pilot portion 82 over which the assembled drum back and ring are mounted. The assembly is held in position on table 78 by an air actuated ram 84, the pad 86 of which includes a ring 88 rotatably mounted on the pad by means of bearings 90. Means not illustrated are provided for rotating table 78. A welding rod 92 is fed downwardly to the joint between drum back 10 and ring 14 by feed rollers 94 and flux is directed to the point of welding by a funnel 96.

The operation of the welding machine shown in Fig. 6 is automatic. Upon actuation of a starting switch, the supporting table 78 begins to revolve, the flux flows by gravity from an overhead hopper through the funnel 96 and the feed rollers 94 are actuated to establish an arc and maintain it until the table makes one complete revolution.

With the arrangement shown in Figs. 1, 2 and 3, it will be observed that the operation of trimming the drum ring flange to size is eliminated as is the expense of maintaining this trim die. At the same time, the necessity for a separate trimming operation for the outer diameter of the drum back is eliminated. Drum back 10 is initially sized so that its diameter is a few thousandths of an inch less than the diameter of the opening in die 56. These advantages are coupled with the fact that a uniformly tight joint is obtained between the drum back and ring flange and the welder may be adjusted to produce the depth of weld penetration desired.

Some drum backs and other stampings, because of deep draws or other irregular configurations, come out of the blank-and-draw operations with scallops or other irregularities around the periphery thereof. If drum backs in this condition were used to pierce a drum ring flange in the manner illustrated in Figs. 1, 2 and 3, the resulting joint would be too far out of circularity for the head of automatic arc welders to lay the arc weld bead in the joint. To assure a circular joint under such conditions, a punch and die assembly as shown in Figs. 7, 8 and 9 is used to simultaneously pierce an edge portion of both the drum back and the drum ring.

Figure 7:
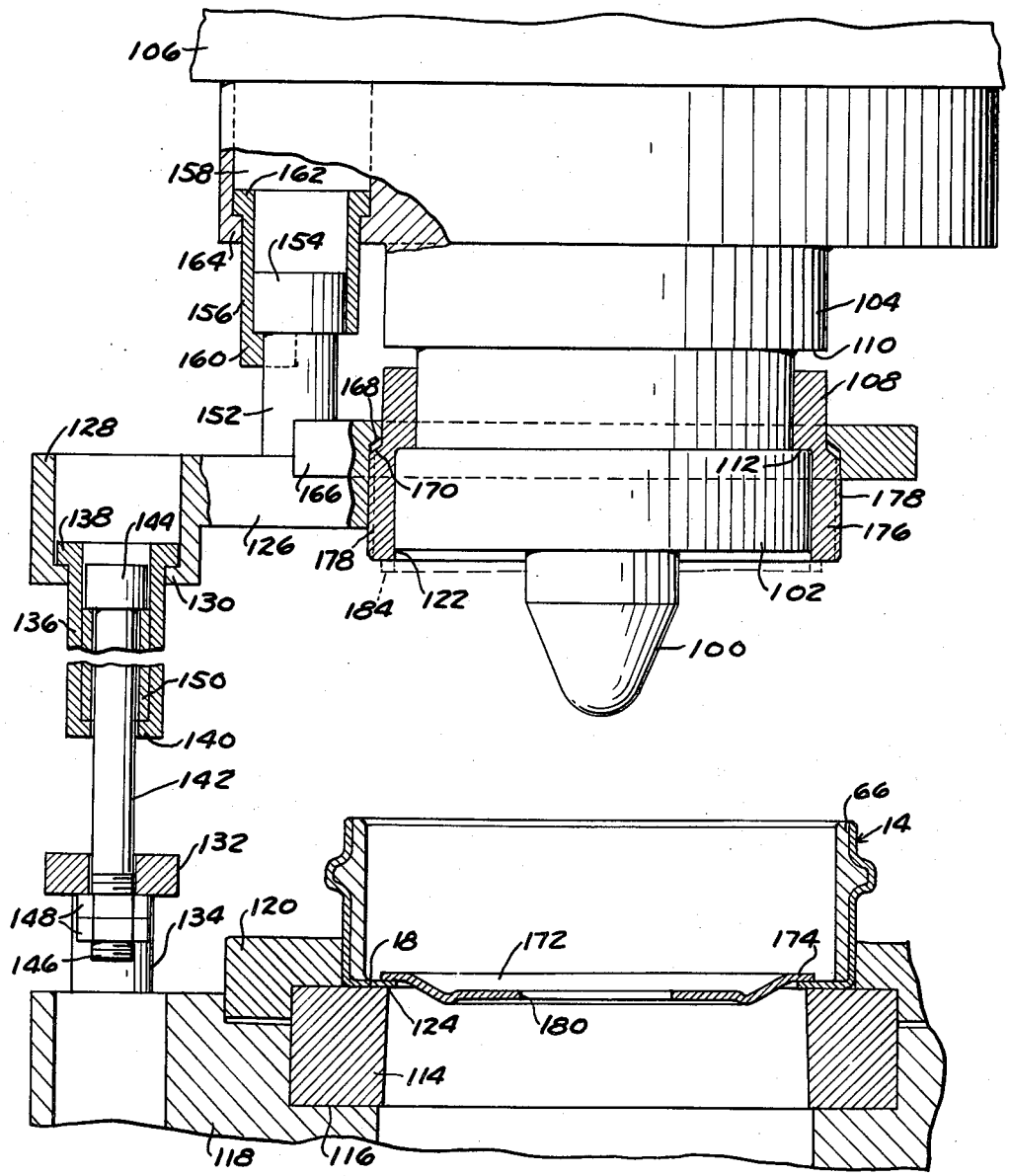
Figure 7 is a fragmentary vertical sectional view of a punch and die assembly utilized for practicing another embodiment of the present invention, the punch being shown at the top of its stroke.
Figure 8:
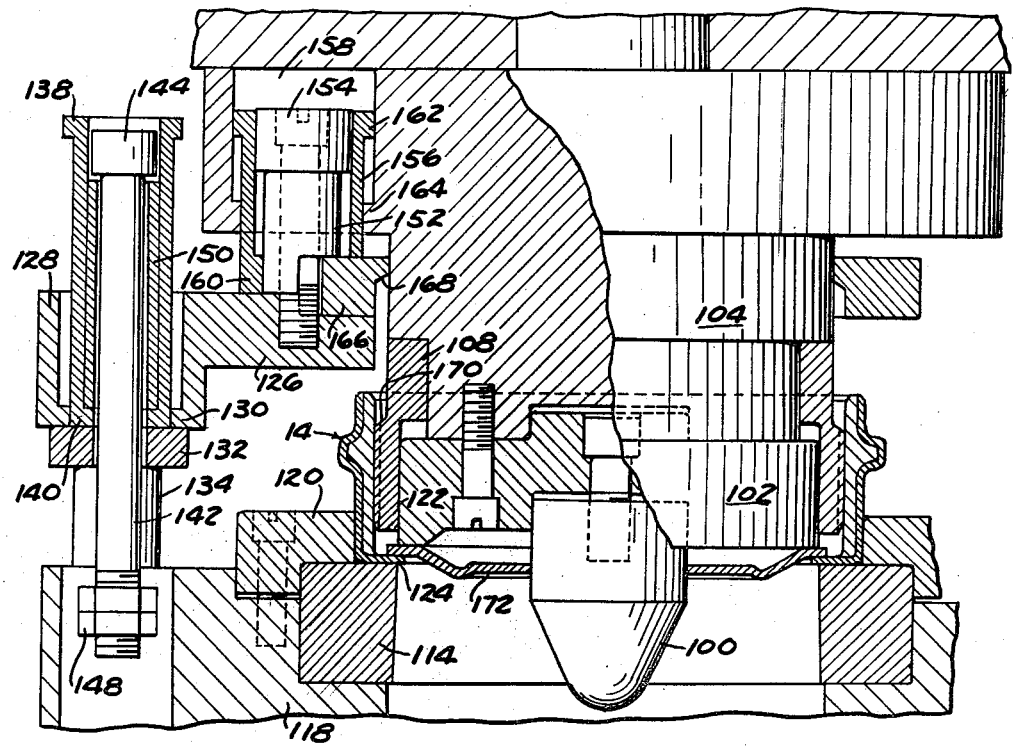
Figures 8 and 9 are views similar to Figure 7 and showing the action of the punch on its down stroke, the showing in Figure 9 being at the bottom of the down stroke of the punch.
Figure 9:
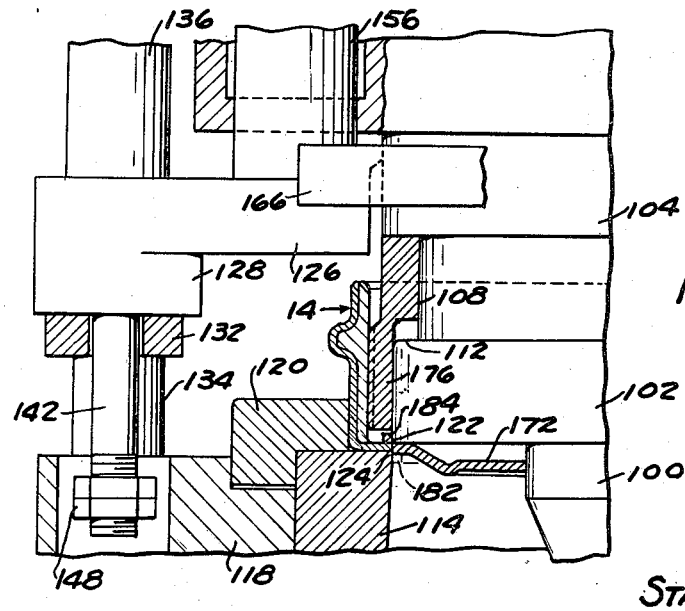

The arrangement illustrated in Figs. 7, 8 and 9 includes a punch assembly comprising a pilot member 100, a punch proper 102 and a punch holder 104 mounted on the ram 106 of the press. A centering and stripping ring 108 has a close sliding fit around a portion of punch 102 and holder 104. Ring 108 is arranged to slide freely between an upper shoulder 110 on punch holder 104 and a lower shoulder 112 on punch 102.

A solid shear die ring 114 is seated in an annular groove 116 in a die shoe 118. Die ring 114 is held down by a retainer ring 120 which also serves as a centering means for the drum ring 14. Punch 102 and die 114 have vertically aligned cutting edges 122 and 124, respectively.

The additional structure illustrated in Figs. 7, 8 and 9 comprises a stripping mechanism. The stripping mechanism can be other than as illustrated so the construction and operation thereof will therefore be only generally described. This mechanism includes a stripper plate 126 which has four equally spaced, apertured ears, one of which is shown at 128. These ears form sockets having an inwardly turned flange 130 at the lower end thereof. In the lowered position of the press ram (Fig. 9), the flanges 130 rest upon a rectangular stop plate 132 fixedly supported on the die shoe 118 by tubular spacers 134. A tube 136 is slidably arranged within each socket 128. Tube 136 has an outwardly turned flange 138 at its upper end and an inwardly turned flange 140 at its lower end. In the raised position of the press ram (Fig. 7), flange 138 of tube 136 seats upon flange 130. Within tube 136, there is arranged a stripper bolt 142 having a nut 144 threaded to its upper end. The lower end of bolt 142 is threaded as at 146 to receive a pair of lock nuts 148. The portion of bolt 142 within tube 136 is surrounded by a sleeve 150.

The stripper plate 126 has four guide pins projecting from the upper face thereof, one of which is shown at 152. Each guide pin 152 has an enlarged head 154 at its upper end that is slidably arranged within a tube 156 that is in turn slidably engaged within a socket 158 formed in the punch holder 104. At its lower end, tube 156 has a radially inwardly extending flange 160 arranged to engage the enlarged head 154 of guide pin 152;

and at its upper end, tube 156 has a radially outwardly extending flange 162 which, in the raised position of the press ram, engages with a shoulder 164 at the lower end of socket 158. Around its inner periphery, stripper plate 126 has a ring 166 fixed thereon. Ring 166 is formed with a sloping shoulder 168 that is shaped to mate with a correspondingly shaped shoulder 170 on the centering ring 108.

With the press ram in the top position of its stroke, as shown in Fig. 7, a drum ring 14 is placed on the die 114 and generally centered thereon by the ring 120. An untrimmed drum back 172 is placed on the inner or upper face of the ring flange 18. Drum back 172 differs from drum back 10, previously described, primarily in that it has a larger diameter and the peripheral edge thereof may not be of accurate circular shape. As a matter of fact, drum back 172 is dimensioned so that the annular flange 174 thereof overlaps not only flange 18 of drum ring 14 but also the cutting edge 124 of die 114.

At the start of the downward stroke of the ram, the ring 108 rests upon the shoulder 112 on the punch 102. As the ram descends, the lower end portion 176 of ring 108 engages the inner surface of drum ring 14 to center the drum ring with respect to the punch and the die and prevent movement thereof. To accommodate manufacturing variables such as variations in the inner diameter of the cast line 66 of drum ring 14 or the out-of-roundness thereof, ring 108 is formed so that it contacts the inner surface of the cast liner 66 at only three or four points. This is accomplished by having several axially extending ribs 178 on the outer surface of the lower portion 176 of ring 108. When the centering ring 108 engages the inner surface of the cast liner 66, the ring 108 moves upwardly relative to the punch 102 and engages the shoulder 110 on the punch holder 104. Continued downward movement of the punch forces the centering ring 108 into the drum ring 14. At about the same time, the tapered center pilot 100 enters the pierced central aperture 180 in the drum back 172 and thereby centers the drum back relative to the drum ring 14. The relative positions of the various components of the press at this point are illustrated in Fig. 8. At this point, the lower end of punch 102 is contacting the inner or upper face of the annular flange 174 of drum back 172. As the punch continues to move downwardly, the sharp outer edge 122 of the punch starts to shear through the flange 174 of drum back 172. Simultaneously, however, the sheared edge of the back 172, backed by the punch 102 and in cooperation with the cutting edge 124 of die 114, shears off the portion of flange 18 that extends radially inwardly beyond the cutting edge 124 of die 114. The punch continues downwardly, and its stroke is adjusted such that at the bottom of the stroke, the upper or inner faces of flanges 18 and 174 are flush and the piercing operation is completed (Fig. 9). The flange portion 182 trimmed from flange 18 will drop down through the die 114. However, the trimmed off edge 184 of flange 174 is tight on the punch 102 and the drum ring 14 is wedged tightly on the centering ring 108.

As the press ram starts to rise from the bottom of the stroke illustrated in Fig. 9, the punch carries the drum ring 14 and the trimmed edge 184 upwardly with it. Eventually, flange 130 engages flange 138 at the upper end of tube 136 to raise stripper bolt 142. When nuts 148 engage plate 132, the upward movement of stripper plate 126 is arrested. At this point, the drum ring 14 still rising with punch 102 is engaged by the lower face of stripper plate 126 and is stripped from the ring 108. The ring 108 rises with punch 102 until the shoulder 170 thereon engages the shoulder 168 on ring 166 to strip the trimmed edge 184 from the lower end of the punch.

With the method illustrated in Figs. 7, 8 and 9, it will be observed that the drum back 172 and the drum ring 14 are simultaneously pierced, the piercing of the flange 18 of the drum ring being accomplished by the sheared edge of the drum back 172 in cooperation with the cutting edge 124 of die 114. Thus, in both of the embodiments illustrated and described herein, the drum back pierces the flange of the drum ring and a tight uniform fit between the drum back and the drum ring is always obtained. As pointed out previously, this permits a close control of the depth of weld penetration. The method herein described also results in an automatic assembly of the two parts, the fit between the parts being such that they can be handled as one. As a matter of fact, when the parts are assembled in this manner, the fit between them is so tight that they can be dropped or tossed into a storage container without danger of their falling apart. In addition, it will be noted that wear on the cutting edges of the punch and the die does not detrimentally affect the fit between the parts.

I claim:

1. The method of forming a sheet metal brake drum which comprises forming a sheet metal drum back with a circular outer periphery, forming a sheet metal drum ring with a circular inner periphery smaller in diameter than the drum back, placing the drum ring on a die having a circular opening therein, the edge of which forms a cutting edge having generally the same diameter as the drum back, placing the drum back on the drum ring, centering the drum back and drum ring relative to the cutting edge of the die, driving the drum back into the drum ring to pierce the drum ring and tightly engage the drum back in the opening pierced in the drum ring and while the drum back and drum ring are in the thus assembled condition, welding them together along the mating edges thereof.

2. The method of making a sheet metal brake drum which comprises forming a sheet metal drum back with a generally circular outer periphery, forming a drum ring with a generally circular inner periphery of smaller diameter than said outer periphery of the drum back, placing said drum parts in overlapping relation between a punch and a die having vertically aligned circular cutting edges of a diameter intermediate the diameters of said peripheral edges of the drum back and ring, centering said parts relative to the cutting edges of the punch and die, driving the punch towards the die a distance sufficient to cause the punch to shear an outer peripheral edge portion from around the drum back and to shear an inner peripheral edge portion from around the opening in the drum ring between the die and the trimmed drum back and arresting the movement of the punch toward the die while the trimmed drum back is engaged within the opening pierced in the drum ring and welding said parts together along the circumferential joint therebetween while they are in the thus assembled relation.

3. The method called for in claim 2 wherein the movement of the punch toward the die is arrested when one face of the trimmed drum back and the corresponding face of the drum ring adjacent said joint are in generally coplanar relation.

4. The method of uniting a sheet metal brake drum back with a sheet metal brake drum ring having a radially disposed flat flange which comprises placing the drum ring between a separated punch and die, the die having a cutting edge adapted to pierce a large round hole in the flat flange of the ring to accommodate the drum back, centering the drum ring on the die so that it is concentric with the cutting edge, placing the drum back on the flat flange of the drum ring with the outer peripheral edge of the drum back concentric with the ring, bringing the punch and die together so that the drum back is engaged by the punch and driven into the flange of the ring, thus causing the outer peripheral edge of the drum back to cooperate with the cutting edge of the die to pierce a hole in the flat flange of the ring, said drum back being driven into the flat flange of the ring to an extent such that the drum back is frictionally engaged within the opening pierced in the drum ring and while the two parts are so assembled, welding them together along the mating edges thereof at said opening.

5. The method called for in claim 4 wherein the drum back is positioned on the flat flange of the drum ring with the outer peripheral edge portion thereof overlapping the cutting edge of the die.

6. The method of uniting a generally circular sheet metal brake drum back with a sheet metal brake drum ring having a radially disposed flat flange provided with a generally circular opening of smaller diameter than the drum back which comprises placing the drum ring between a separated punch and die, the die having a cutting edge defining a circular hole having a diameter corresponding to the diameter of the drum back, centering the drum ring on the die so that it is concentric with the cutting edge of the die, placing the drum back on the flat flange of the drum ring with the outer peripheral edge of the drum back axially aligned with the cutting edge of the die, bringing the punch and die together so that the drum back is engaged by the punch and driven into the flange of the ring, whereby the outer peripheral edge of the drum back cooperates with the cutting edge of the die to pierce a hole in the flat flange of the ring, said drum back being driven into the flat flange of the ring to an extent such that the drum back is frictionally engaged within the opening pierced in the drum ring and while the two parts are so assembled, welding them together along the mating edges thereof at said opening.

7. The method called for in claim 6 wherein the portion of the punch that engages the drum back has a greater diameter than the drum back so that it extends radially outwardly beyond the peripheral edge of the drum back and the drum back is driven into the flat flange of the ring to a position wherein the radially outwardly extending portion of the punch bottoms on the adjacent face of the flat flange of the ring.

References Cited in the file of this patent

UNITED STATES PATENTS

| | | |
|---|---|---|
| 1,128,532 | Schmidt | Feb. 16, 1915 |
| 2,120,711 | Phillips | June 14, 1938 |
| 2,549,032 | Taylor | Apr. 17, 1951 |
| 2,593,506 | Wales | Apr. 22, 1952 |

FOREIGN PATENTS

| | | |
|---|---|---|
| 445,173 | France | Aug. 28, 1912 |